United States Patent
Siegmund (10) Patent No.: US 10,113,578 B2
(45) Date of Patent: Oct. 30, 2018

(54) BOLT FOR CLAMPING ADJOINING PARTS

(71) Applicant: Bernd Siegmund, Grossaitingen (DE)

(72) Inventor: Bernd Siegmund, Grossaitingen (DE)

( * ) Notice: Subject to any disclaimer, the term of this patent is extended or adjusted under 35 U.S.C. 154(b) by 98 days.

(21) Appl. No.: 15/310,366

(22) PCT Filed: Jul. 8, 2015

(86) PCT No.: PCT/EP2015/001385
§ 371 (c)(1),
(2) Date: Nov. 10, 2016

(87) PCT Pub. No.: WO2016/020028
PCT Pub. Date: Feb. 11, 2016

(65) Prior Publication Data
US 2018/0051736 A1    Feb. 22, 2018

(30) Foreign Application Priority Data

Aug. 4, 2014 (DE) .................. 10 2014 011 309

(51) Int. Cl.
| F16B 21/00 | (2006.01) |
| F16B 21/16 | (2006.01) |
| F16B 19/10 | (2006.01) |

(52) U.S. Cl.
CPC .......... F16B 21/165 (2013.01); F16B 19/109 (2013.01)

(58) Field of Classification Search
USPC ..... 411/340, 347, 348, 357, 553, 21, 32, 33, 411/45, 54.1, 57.1, 80.2, 46, 47, 76, 77, 411/80
See application file for complete search history.

(56) References Cited

U.S. PATENT DOCUMENTS

| 2,314,445 | A | * | 3/1943 | Du Vall | ............. F16B 19/1081 411/44 |
| 2,625,071 | A | * | 1/1953 | Lewis | .................. E21D 21/008 411/53 |
| 3,266,364 | A | * | 8/1966 | Becker | ................. F16B 19/109 411/44 |
| 3,552,258 | A | * | 1/1971 | Warner | .............. F16B 13/0891 411/21 |

(Continued)

FOREIGN PATENT DOCUMENTS

| CN | 202628720 U | 12/2012 |
| DE | 29 06 914 | 9/1980 |

(Continued)

OTHER PUBLICATIONS

International Search Report issued by the European Patent Office in International Application PCT/EP2014/001918.

(Continued)

*Primary Examiner* — Gary W Estremsky
(74) *Attorney, Agent, or Firm* — Henry M. Feiereisen LLC (57) ABSTRACT

A bolt for clamping adjoining parts includes a bolt body adapted for insertion in openings of the adjoining parts from one side of the adjoining parts. An actuator is received in the bolt body and actuatable from one end of the bolt body. Mounted in the bolt body and interacting with the actuator is a clamping mechanism which includes tilting elements configured to tilt out of the bolt body in opposition to a restoring force, when the actuator is actuated.

11 Claims, 6 Drawing Sheets

(56) References Cited

U.S. PATENT DOCUMENTS

| | | | | |
|---|---|---|---|---|
| 4,293,259 A | * | 10/1981 | Liebig | F16B 13/0833 411/32 |
| 4,315,708 A | | 2/1982 | Liebig | |
| 4,380,407 A | * | 4/1983 | Donan, Jr. | E21D 21/008 405/259.3 |
| 4,639,163 A | | 1/1987 | Buthe et al. | F16B 7/00 |
| 4,797,044 A | * | 1/1989 | Velasco | F16B 13/065 411/45 |
| 4,940,372 A | * | 7/1990 | Fischer | F16B 13/063 411/32 |
| 5,284,409 A | * | 2/1994 | Miyanaga | F16B 13/0858 411/55 |
| 5,318,284 A | | 6/1994 | Demmeler et al. | |
| 6,048,148 A | * | 4/2000 | Gassner | F16B 13/0858 411/54 |
| 6,623,225 B1 | * | 9/2003 | Groenendijk | F16B 13/0866 411/21 |
| 8,052,105 B2 | * | 11/2011 | Lippert | H04R 1/026 248/187.1 |
| 2004/0136802 A1 | * | 7/2004 | Lin | F16B 13/0858 411/57.1 |
| 2010/0175439 A1 | | 7/2010 | Thomas et al. | |
| 2014/0056668 A1 | | 2/2014 | Demmeler | |

FOREIGN PATENT DOCUMENTS

| | | |
|---|---|---|
| DE | 91 09 540.9 | 10/1991 |
| DE | 199 17 209 | 11/2000 |
| DE | 202 19 317 | 3/2003 |
| DE | 101 54 692 | 5/2003 |
| DE | 10 2011 101 096 | 12/2015 |
| EP | 0 541 904 | 5/1993 |
| EP | 2 333 356 | 6/2011 |
| FR | 2817596 A1 | 6/2002 |
| WO | WO 2008/149142 | 12/2008 |

OTHER PUBLICATIONS

Translation of Chinese Search Report dated Mar. 27, 2018 with respect to counterpart Chinese patent application 201580037712.3.

* cited by examiner

BOLT FOR CLAMPING ADJOINING PARTS

CROSS-REFERENCES TO RELATED APPLICATIONS

This application is the U.S. National Stage of International Application No. PCT/EP2015/001385, filed Jul. 8, 2015, which designated the United States and has been published as International Publication No. WO 20161020028 and which claims the priority of German Patent Application, Serial No. 10 2014 011 309.4, filed Aug. 4, 2014, pursuant to 35 U.S.C. 119(a)-(d).

BACKGROUND OF THE INVENTION

The invention relates to a bolt for clamping adjoining parts, which have openings, including a bolt body which can be introduced into the openings from one side of the adjoining parts, an actuator which can be actuated from one end of the bolt body, as well as clamping means, which are mounted in the bolt body and are partially movable from out of the bolt body with the actuator.

A bolt of the type mentioned above is known from EP 2 333 356 B1, with which two or more adjoining parts of any kind, which have openings, can be clamped to each other. Bolts of this type include a bolt body into which a threaded spindle can be screwed in from the one end face, which threaded spindle extends beyond the bolt body at this end and at the same time serves as a hand wheel, usually with greater diameter in relation to the bolt body. Provided at this end of the bolt body is a sliding sleeve, which is arranged non-rotatable but displaceable in the longitudinal direction and protrudes radially outwardly beyond the bolt body. At the opposite end, the bolt body has radially outwardly extending through openings, through which clamping element in the form of balls can be moved outwards far enough as to project beyond the outer circumference of the bolt body at this point. The radial outward movement of these balls is achieved with the aid of the threaded spindle, which, in the area of the clamping elements, has a conical, frustoconical surface which tapers towards the end away from the handle. As soon as this frustoconical surface comes into contact with the balls and the threaded spindle is screwed further forward, this conical surface presses the balls outwards so that they project beyond the outer circumference of the bolt body. Prior to clamping, the balls are in the retracted state within the bolt body. As a result, it is possible to slide the bolt with the end having the balls through the aligned openings of the adjoining parts until the balls are in front of the outer surface of the parts. Now, the thread spindle is screwed forward with the aid of the handle, so that the balls are initially moved outwards. The handle of the threaded spindle, which has a greater diameter than the external diameter of the bolt body, is still at a distance from the sliding sleeve. By further forward screwing of the threaded spindle, the stop surface of the handle at the end face progressively approaches the sliding sleeve and ultimately presses the latter against the outwardly moved balls at the other end of the bolt. Thus, with only a few manipulations, a simple, very high load-bearing and play-free connection of two or more adjoining parts is thus possible.

DE 199 17 209 C2 discloses another bolt of the aforementioned type. In this bolt, a support element of greater diameter is arranged on the bolt body and is either fixedly connected to the bolt body or can be changed in position on the bolt body by engaging with an internal thread into an external thread provided on the outside of the bolt body. Clamping of the adjoining parts is again realized by means of balls as clamping means between the balls and the support element.

DE 202 19 317 U1 discloses a further bolt of the aforementioned type. This bolt also has a support element of greater diameter than the bolt body. The actuator, for example a threaded spindle, has a handle which is configured pot-like and overlaps the support element. Clamping of the adjoining parts is again realized by means of balls as clamping means between the balls and the handle.

For example, such bolts are used for clamping adjoining parts in conjunction with welding tables, with which objects can be clamped and welded or otherwise processed. In addition, there are also numerous other possible applications for welding tables, for example, for the measuring of devices or the like. Such welding tables are known, for example, from EP 0 541 904 A1 or IDE 91 09 540 U1.

Welding tables have in their surface and, optionally, also in the side panels of the table top, a plurality of mostly round openings which are arranged in a uniform grid dimension. In addition, the welding tables have a wide range of accessories with which the clamping of objects is possible. Thus, essentially angular supports are provided, which also have round openings or also oblong openings. These supports can be connected to one another or to the table by clamping elements, such as clamping bolts, which can include a threaded screw with associated nut. In addition, the aforementioned bolts also find application, which are inserted from one side into the openings of the table and are supported within the opening or on the underside of the table top.

In addition, screw clamps are used in connection with welding tables as clamping element and also serve to clamp objects. Various stops with round and/or oblong openings and prisms are also known as further accessories.

The openings in the welding tables and in their accessories are usually designed as round throughbores, which can be chamfered, i.e. can have a frustoconical depression.

When balls are used as clamping means in the bolts, there is, however, the disadvantage that the balls only engage in a point-shaped or linear manner in the region of the opening on the one of the parts to be clamped so that clamping forces can cause material deformations.

Such material deformations can be avoided, when there is a form-fitting connection between the clamping means of the bolts and the adjoining parts to attain a distribution of the clamping forces. When using the afore-mentioned threaded screws with associated nut as a clamping element, both the head of the threaded screw and the nut rest formfittingly on the parts to be clamped. In the case of chamfered throughbores, connecting bolts are known with a countersunk head arranged on the bolt body and a countersunk head screw which makes possible a solid screw connection of two or more adjoining parts. However, both the threaded screw with associated nut and the connecting bolt can not be handled from one side.

DE 10 2011 101 096 A1 describes a bolt of the afore-mentioned type, in which the clamping means is designed as at least one sliding element mounted in the bolt body in fixed rotative engagement, and the outer portion of the sliding element has a supporting surface in the form of an outer surface segment of a truncated cone or an annular supporting surface. Though this results in a form-fitting connection between the sliding elements and the parts to be clamped However, due to frictional forces, problems may arise when loosening the connection, i.e. it is not guaranteed that the sliding elements will move again into the interior of the bolt body in order to be able to pull the bolt out of the openings.

Reference is made to the content of the publications cited in the art and made as subject of the present application.

SUMMARY OF THE INVENTION

The present invention is based on the problem to provide a bolt which can be handled from one side with another clamping means.

This object is achieved by a bolt for clamping adjoining parts which have openings, with the bolt including a bolt body which can be inserted into the openings from one side of the adjoining parts, an actuator which can be actuated from one end of the bolt body, and clamping means, which are mounted in the bolt body and are movable with the actuator partially out of the bolt body. It is now proposed in accordance with the invention to provide as clamping means tilting elements, which can be tilted out of the bolt body in opposition to a restoring force. As a result of the configuration of the clamping means as tilting elements, it is ensured that no unwanted frictional forces are encountered to impede a tilting back of the tilting elements into the bolt body, when the connection is loosened. The presence of a restoring force advantageously assists this even further. The tilting elements can hereby be loosely mounted in receptacles of the bolt body and tilted about an edge of the tilting element. It would also be conceivable to secure the tilting elements tiltably about axes in the bolt body.

Advantageous embodiments of the invention are set forth in the subclaims.

The openings in the adjoining parts may be throughbores which, optionally, have a depression.

The bolt may include a sliding sleeve which is arranged non-rotatably at one end of the bolt body but displaceable in longitudinal direction and which protrudes outwardly beyond the bolt body. Alternatively, it is also possible for the bolt body to have a support element which is either fixed or adjustable via an external thread on the bolt body.

The actuator can be a threaded spindle which engages in an internal thread of the bolt body and which is optionally connected to a handle. The threaded spindle can be provided with a hexagon socket with or without a handle. The handle can be designed pot-shaped and overlap the bolt body. Alternatively, the use of a quick-release mechanism is also conceivable.

The tilting elements are advantageously configured for form-fitting contact on one of the adjoining parts in the tilted-out state.

According to a preferred embodiment of the bolt, at least two, preferably four, tilting elements are provided, having a cross-section which is a circular ring sector in longitudinal direction of the bolt.

The restoring force can be formed in a simple manner by an elastic O-ring which embraces the tilting elements. It would also be conceivable to realize the restoring force by springs.

When the actuator, for example, the threaded spindle, engages the tilting elements via balls, a particularly smooth configuration is established. Alternatively, it would also be possible for the actuator to directly engage the tilting elements, which could optionally be configured with corresponding attachments.

In order to ensure a reliable function of the bolt, in particular when the tilting elements are loosely mounted in the bolt body, it is proposed that the bolt has an anti-rotation mechanism for the tilting elements.

In an embodiment of the bolt, in which the actuator engages the tilting elements via balls, a simple anti-rotation mechanism is established, when the tilting elements each have a notch in which the ball engages the tilting element.

In embodiments of the bolt with or without balls, via which the actuator engages the tilting elements, provision may be made for guide pins or guide ribs as an anti-rotation mechanism between the tilting elements on the bolt body.

BRIEF DESCRIPTION OF THE DRAWING

Exemplary embodiments of the invention are explained in more detail with reference to the drawing. It is shown in:

FIG. 4a a section along the line IV-IV of FIG. 3 in the unclamped state of the bolt, FIG. 4b a section along the line IV-IV of FIG. 3 in the clamped state of the bolt, FIGS. 5a, 5b and 5c various views of a tilting element of the bolt of FIG. 1, FIG. 6 a section along the line VI-VI of FIG. 5a, FIG. 7 a perspective view of another bolt, FIG. 8 an exploded view of the bolt of FIG. 7, FIG. 9 a top view of the bolt of FIG. 7, FIG. 10a a section along the line X-X of FIG. 9 in the unclamped state of the bolt, FIG. 10b a section along the line X-X of FIG. 9 in the clamped state of the bolt, FIG. 11 a section along the line XI-XI of FIG. 9 in the clamped state of the bolt, FIGS. 12a, 12b and 12c different views of a tilting element of the bolt of FIG. 7, FIG. 13 a section along the line XIII-XIII of FIG. 12a, FIG. 14 a perspective view of a further bolt, FIG. 15 an exploded view of the bolt of FIG. 14, FIG. 16 a top view of the bolt of FIG. 14, FIG. 17a a section along the line 16 in the unclamped state of the bolt, FIG. 17b a section along the line XVII-XVII of FIG. 16 in the clamped state of the bolt, FIG. 18 a section along the line XVIII-XVIII 16 in the clamped state of the bolt, FIGS. 19a, 19b and 19c different views of a tilting element of the bolt of FIG. 14 and FIG. 20 a section along the line XX-XX of FIG. 19a.

DETAILED DESCRIPTION OF PREFERRED EMBODIMENTS

Figure 1:
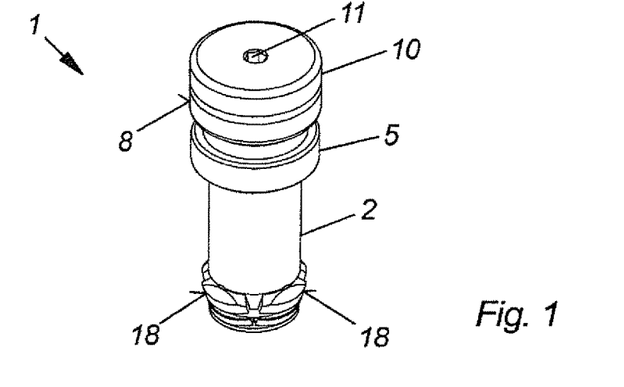
FIG. 1 a perspective view of a bolt.
Figure 2:
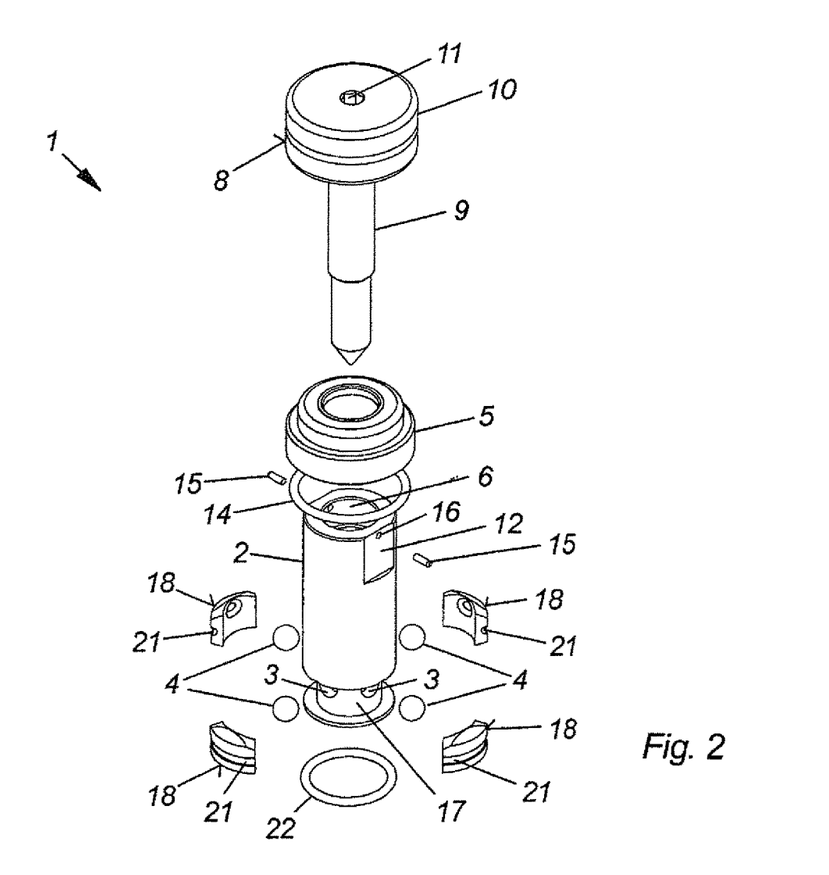
FIG. 2 an exploded view of the bolt of FIG. 1.
Figure 3:
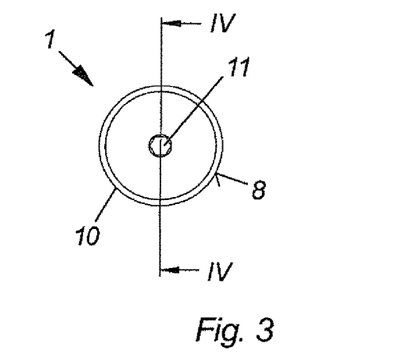
FIG. 3 a top view of the bolt of FIG. 1.

FIGS. 1 to 3 show a bolt 1 for clamping adjoining parts, which have openings, with the bolt being configured as a type of locking bolt. For explanation, reference is additionally made to FIGS. 4a, 4b, which show sectional representations of the bolt 1, and FIGS. 5a, 5b, 5c and 6, which show a tilting element of the bolt 1.

The bolt 1 includes a bolt body 2 which can be inserted into the openings of adjoining parts not shown in the drawing. The openings can be designed as round throughbores, which can be chamfered, i.e., they can have a frustoconical depression. The bolt body 2 is penetrated in an end region by openings 3 in which balls 4 can be moved radially back and forth.

At the other end region of the bolt body 2, a sliding sleeve 5 is non-rotatably but displaceably arranged in longitudinal direction of the bolt body 2 and configured to protrude radially outwardly beyond the bolt body 2.

A bore 6 is provided in the interior of the bolt body 2 and has an internal thread 7 in the upper region. A threaded spindle 8, which has a corresponding external thread 9, can be screwed into the bore 6 as actuator in relation to the bolt body 2. The threaded spindle 8 protrudes hereby at an end face beyond the bolt body 2 and the sliding sleeve 5 and is widened there to form a handle 10. The handle 10 is non-rotatably connected, optionally in one piece, to the threaded spindle 8 and has a hexagon socket 11 at its end face for receiving a corresponding key with lever arm.

The handle 10 and/or the sliding sleeve 5 can be knurled or provided with a non-slip coat to increase the gripping capability.

The sliding sleeve 5 is axially displaceable in longitudinal direction with respect to the bolt body 2 along non-round, preferably flat, sliding surfaces 12, but due to the non-roundness, these sliding surfaces 12 are non-rotatably connected to the bolt body 2. The sliding sleeve 5 preferably has hereby the same outer diameter as the handle 10 and, in particular, a greater outer diameter than the diameter of the openings in the adjoining parts, so that the sliding sleeve 5 with its end face 13 bears upon the part to be clamped.

A groove for receiving an O-ring 14 is provided in the end face 13 of the sliding sleeve 5 so that the sliding sleeve 5 and thus also the bolt body 2 cannot easily rotate on the part to be clamped.

Securing pins 15 are inserted through bores 16 in the bolt body 2 in the area of the sliding surfaces 12. The securing pins 15 cooperate with stops, which are not shown in the drawing but sufficiently known from EP 2 333 356 B1, and which are arranged on the sliding sleeve 5 and thus form a securing device to secure the sliding sleeve 5 on the bolt body 2. The threaded spindle 8 hereby secures the position of the securing pins 15 in the bores 16 of the bolt body 2. The sliding sleeve 5 can thus only be displaced on the bolt body 2 until the stop of the sliding sleeve 5 is adjacent to the securing pin 15 so that the sliding sleeve 5 cannot be pushed completely from the bolt body 2, even when the threaded spindle 8 is loosened.

Tilting elements 18 are mounted in the bolt body 2 in a clamping means receptacle 17 in the form of a circumferential wide groove and become particularly apparent from FIGS. 5a, 5b, 5c and 6. Instead of the four tilting elements 18, shown in the exemplary embodiment, at least two tilting elements 18 or a different number could also be provided. The tilting elements 18 are located radially outwards in front of the balls 4, respectively.

Figure 5A:
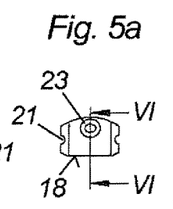
Figure 5B:
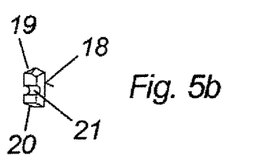
Figure 5C:
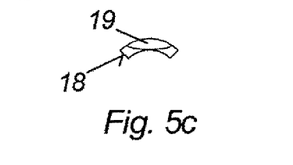
Figure 6:
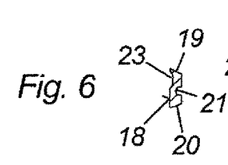
Figure 7:
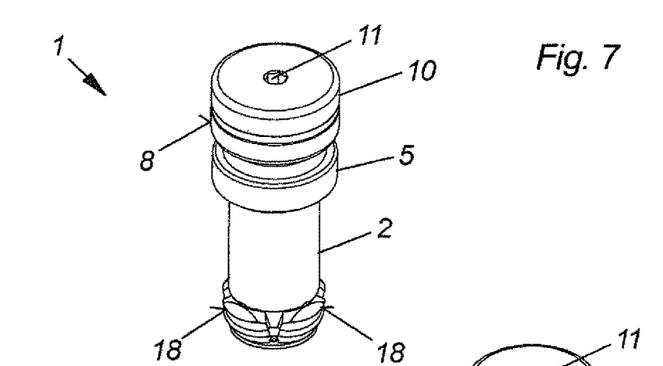
Figure 8:
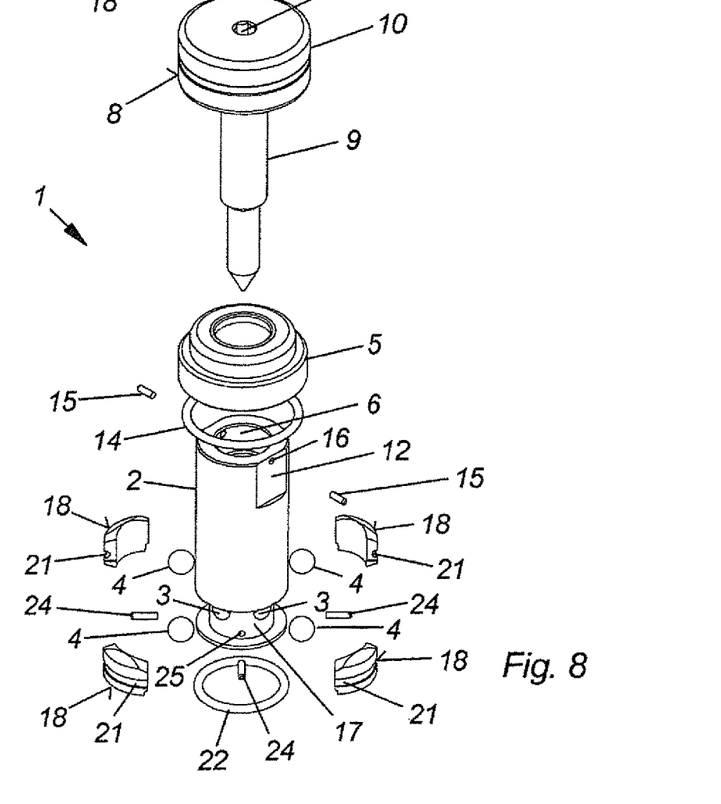
Figure 9:
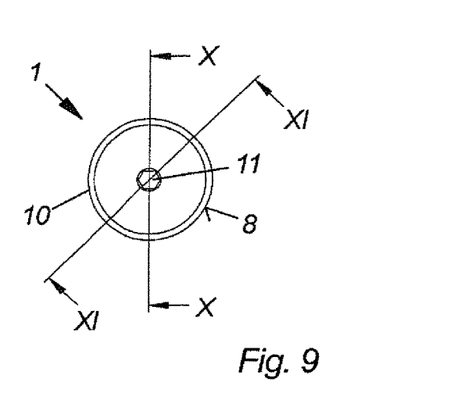
Figure 10A:
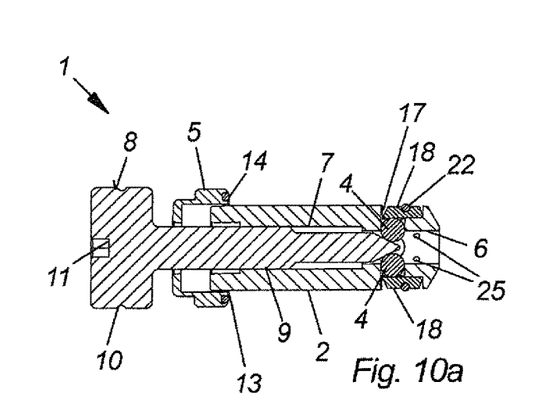
Figure 10B:
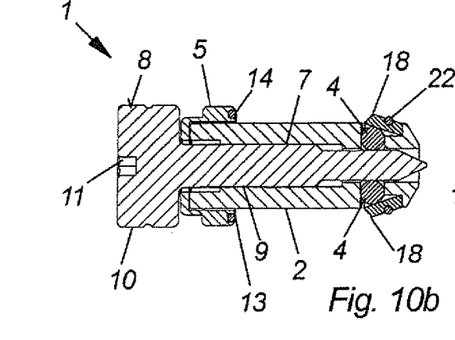
Figure 11:
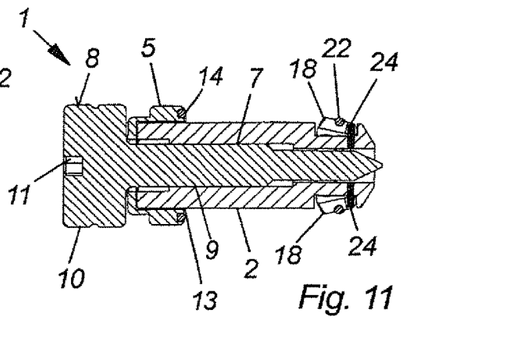

FIG. 5c shows that the cross-section of the tilting elements 18 in longitudinal direction of the bolt 1 is a circular ring sector.

The region 19 of the tilting elements 18 that comes into contact with the part to be clamped is designed for the form-fitting contact on one of the adjoining parts in the tilted-out state explained in more detail further below. The precise configuration of the region 19 can hereby be chosen in dependence on the configuration of the openings in the adjoining parts. The region 20 of the tilting elements 18 in opposition to the region 19 is chamfered in cross-section for tilting.

The tilting elements 18 have a groove 21 for receiving an elastic O-ring 22 which surrounds the tilting elements. The O-ring 22 generates a restoring force upon the tilting elements 18 in the direction of the bolt body 2.

Figure 4A:
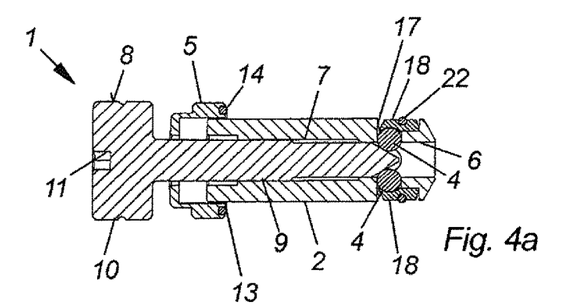
Figure 4B:
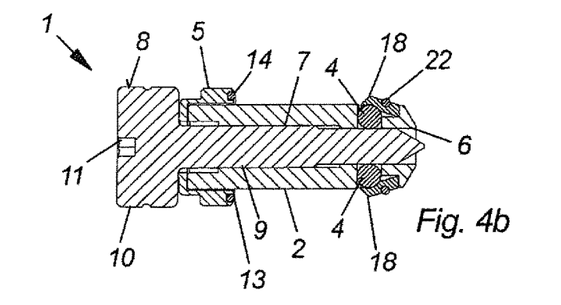

In order to prevent twisting of the tilting elements 18 during the tilting operation, the tilting elements 18 have a notch 23 in which the balls 4 respectively engage the tilting elements 18, as is readily apparent in FIGS. 4a and 4b.

During clamping, the threaded spindle 8 engages the balls 4 with its end opposite the handle 10 and shifts the balls 4 radially outwards, for which purpose the end of the threaded spindle is designed conical. It is understood that another configuration, for example rounded, would also be possible. The balls 4 engage the respective tilting elements 18 during displacement and tilt the tilting elements out of the bolt body 2 in opposition to the restoring force of the O-ring 22. This is ensured by the position of the engagement points of the balls 4 on the tilting elements 18 and the position of the grooves 21 or the O-ring 22, as is readily apparent in FIGS. 4a and 4b.

In the unclamped state of the bolt 1 shown in FIG. 4a, the balls 4 and tilting elements 18 are located in the interior of the bolt body 2 so that the bolt body 2 can be guided through the openings in the adjoining parts to be clamped, until the end 13 of the sliding sleeve 5 rests with the O-ring 14 on one of the adjoining parts.

The bolt 1 is clamped, as shown in FIG. 4b, by using the handle 10 to screw the threaded spindle 8 forwards, i.e., in FIG. 4b toward right with respect to the bolt body 2. As a result, the end of the threaded spindle 8 in opposition to the handle 10 comes into contact with the balls 4 and presses them radially outwards, so that the tilting elements 18 tilt out of the bolt body 2. Since the balls 4 engage in the notch 23 on the tilting elements 18, twisting of the tilting elements 18 during tilting is prevented. As the threaded spindle 8 is further screwed in, the handle 10 ultimately comes into contact with the sliding sleeve 5 and displaces it on the bolt body 2 in the direction of the tilting elements 18 until the not shown adjoining parts are clamped between the tilting elements 18, i.e., between the region 19 of the tilting elements 18 coming into contact with the part to be clamped and the end face 13 of the sliding sleeve 5. The bolt 1 thus enables clamping of adjoining parts with different overall thicknesses.

FIGS. 7 to 13 show another bolt 1 and FIGS. 14 to 20 show a further bolt 1 for clamping adjoining parts, which differ by the design of the anti-rotation mechanism for the tilting elements 18. Corresponding components of the bolt 1 are therefore provided with the same reference signs and the detailed description of the bolt 1 of FIGS. 1 to 6 is referred to in order to avoid repetitions.

Tilting elements 18 are mounted in the bolt body 2 in a clamping means receptacle 17 in the form of a circumferential groove. Also, instead of the four tilting elements 18 shown in the exemplary embodiments of FIGS. 7 to 13 and 14 to 20, at least two tilting elements 18 or another number could be provided. The tilting elements 18 are located radially outwards in front of the balls 4 and have no notch 23.

Guide pins 24 are respectively located between the tilting elements 18 for the bolt 1 of FIGS. 7 to 13 and held in openings 25 in the bolt body 2, for example, screwed, glued or press-fitted. The position of the guide pins 24 between the tilting elements 18 is readily apparent when comparing the sectional representations of FIGS. 10b and 11.

Guide ribs 26 are provided between the tilting elements 18 for the bolt 1 of FIGS. 14 to 20 to divide the clamping means receptacle 17 into a respective region for one of the tilting elements 18. It is understood that the guide ribs also have a groove 27 for receiving the O-ring 22.

Figure 12A:
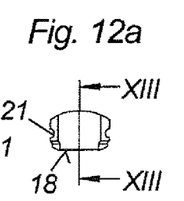
Figure 12B:
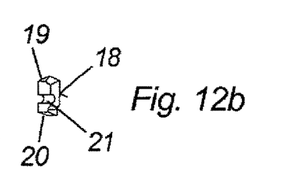
Figure 12C:
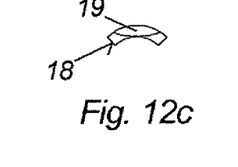
Figure 13:
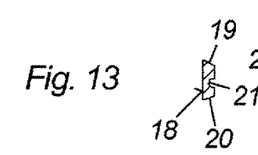
Figure 14:
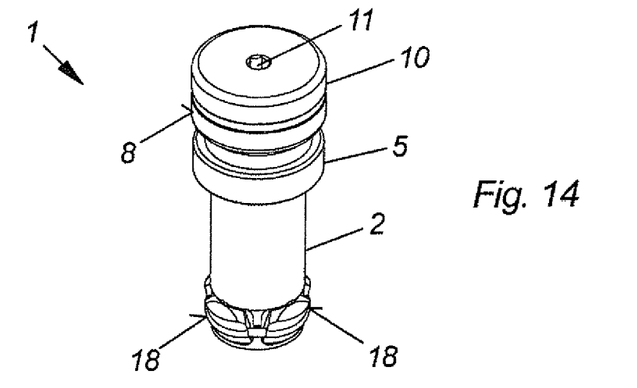
Figure 15:
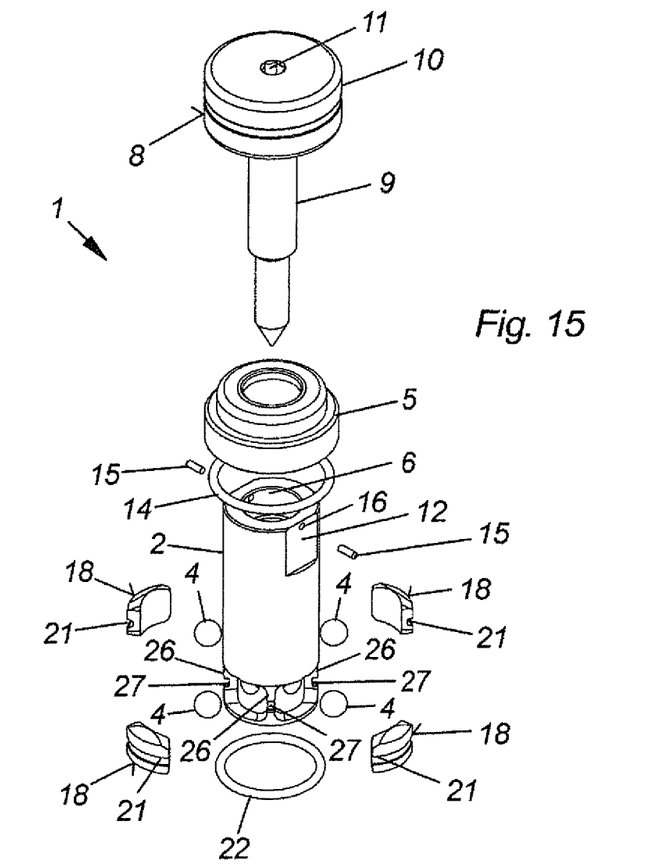
Figure 16:
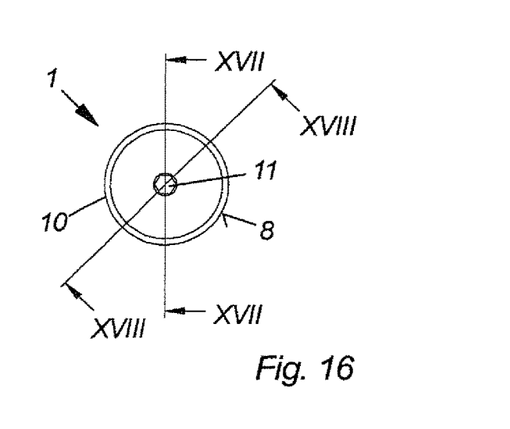
Figure 17A:
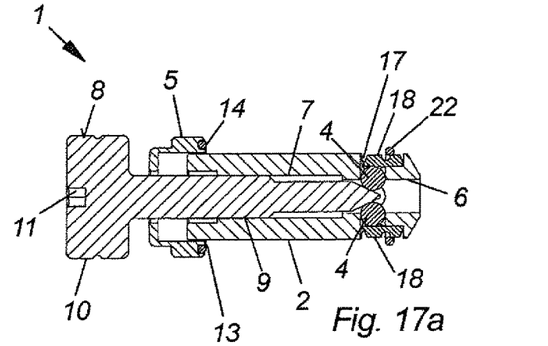
Figure 17B:
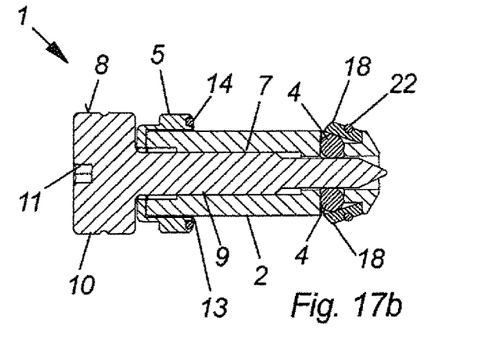
Figure 18:
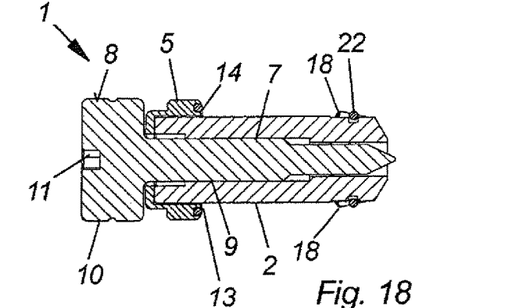
Figures 19A, 20:
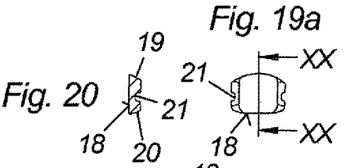
Figure 19B:
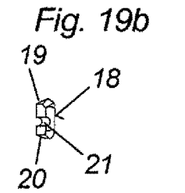
Figure 19C:
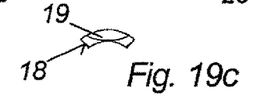

The angle area of the circular ring sector, which forms the cross-section of the tilting elements 18, is smaller in the embodiments of FIGS. 7 to 13 and 14 to 20 in order to leave space between the tilting elements 18 for the guide pins 24 or guide ribs 26, as this is readily apparent from FIGS. 12c and 19c in comparison to FIG. 5c.

The guide pins 24 and guide ribs 26 ensure that the tilting elements 18 cannot twist, when tilting out of the bolt body 2.

With regard to the further design options of bolts for clamping adjoining parts, as described in the introductory part of the description, in particular as disclosed in DE 202 19 317 U1 and DE 199 17 209 C2, it is noted that the tilting elements 18 according to the invention, which can be tilted out from the bolt body 2 in opposition to a restoring force, can also be used in the case of bolts without sliding sleeve, but with support elements and/or pot-shaped handles or with quick-release mechanism.

What is claimed is:

1. A bolt for clamping adjoining parts, comprising:
   a bolt body adapted for insertion in openings of the adjoining parts from one side of the adjoining parts;
   an actuator received in the bolt body and actuatable from one end of the bolt body;
   a clamping mechanism mounted in the bolt body and interacting with the actuator, said clamping, mechanism including tilting elements which are configured to tilt out of the bolt body in opposition to a restoring force, when the actuator is actuated; and
   an anti-rotation mechanism configured to prevent the tilting elements from rotating,
   wherein the clamping mechanism includes balls, said actuator engaging the tilting elements via the balls, said anti-rotation mechanism being realized by providing each of the tilting elements with a notch for engagement by the balls.

2. The bolt of claim 1, wherein the tilting elements are configured for formfitting contact with one of the adjoining parts, when the tilting elements are caused to tilt out by the actuator.

3. The bolt of claim 1, wherein the clamping mechanism includes at least two of said tilting elements, each said tiling element having a cross section in the form of a circular ring sector in a longitudinal direction of the bolt.

4. The bolt of claim 1, wherein the clamping mechanism includes at least four of said tilting elements, each said tiling element having a cross section in the form of a circular ring sector in a longitudinal direction of the bolt.

5. The bolt of claim 1, further comprising an elastic O-ring placed in surrounding relationship to the tilting elements and applying the restoring force.

6. A bolt for clamping adjoining parts, comprising:
   a bolt body adapted for insertion in openings of the adjoining parts from one side of the adjoining parts;
   an actuator received in the bolt body and actuatable from one end of the bolt body;
   a clamping mechanism mounted in the bolt body and interacting with the actuator, said clamping mechanism including tilting elements which are configured to tilt out of the bolt body in opposition to a restoring force, when the actuator is actuated; and
   an anti-rotation mechanism configured to prevent the tilting elements from rotating, said anti-rotation mechanism being realized by providing guide pins or guide ribs between the tilting elements on the bolt body.

7. The bolt of claim 6, wherein the clamping mechanism includes balls, said actuator engaging the tilting elements via the balls.

8. The bolt of claim 6, wherein the tilting elements are configured for formfitting contact with one of the adjoining parts, when the tilting elements are caused to tilt out by the actuator.

9. The bolt of claim 6, wherein the clamping mechanism includes at least two of said tilting elements, each said tiling element having a cross section in the form of a circular ring sector in a longitudinal direction of the bolt.

10. The bolt of claim 6, wherein the clamping mechanism includes at least four of said tilting elements, each said tiling element having a cross section in the form of a circular ring sector in a longitudinal direction of the bolt.

11. The bolt of claim 6, further comprising an elastic O-ring placed in surrounding relationship to the tilting elements and applying the restoring force.

* * * * *